UNITED STATES PATENT OFFICE.

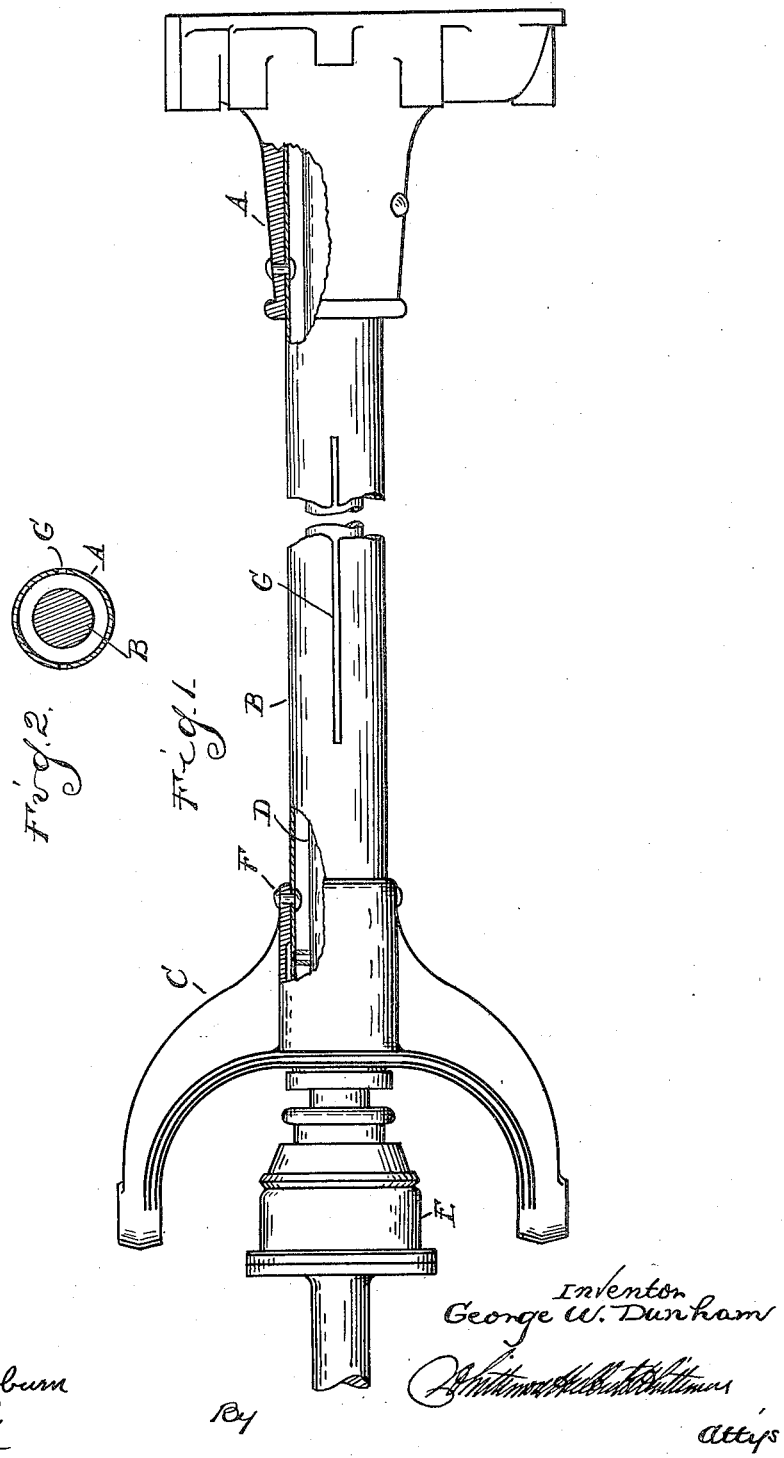

GEORGE W. DUNHAM, OF DETROIT, MICHIGAN, ASSIGNOR TO SAXON MOTOR CAR COMPANY, OF DETROIT, MICHIGAN, A CORPORATION OF MICHIGAN.

TORQUE-TUBE.

1,101,622.     Specification of Letters Patent.     Patented June 30, 1914.

Application filed January 5, 1914. Serial No. 810,504.

*To all whom it may concern:*

Be it known that I, GEORGE W. DUNHAM, a citizen of the United States of America, residing at Detroit, in the county of Wayne and State of Michigan, have invented certain new and useful Improvements in Torque-Tubes, of which the following is a specification, reference being had therein to the accompanying drawings.

The invention relates to torque rod constructions of that type in which a tubular rod is arranged concentric with and surrounding a transmission shaft.

It is the object of the invention to obtain a construction in which the tube is rigidly attached to the yoke or head, and which at the same time makes provision for a slight yielding or twisting of the free end of the tube in relation to this yoke.

In the drawings: Figure 1 is a plan view; and Fig. 2 is a cross section.

A is a portion of the axle housing, B the tubular torque rod extending forward therefrom; and C the yoke for pivotally connecting said tube with the anchoring support, not shown.

D is a transmission shaft extending through the tube B, and E is a universal joint in said shaft alined with the pivot of the yoke.

My improvement consists in dispensing with the usual swivel connection between the tube B and yoke C, in rigidly attaching said tube to the yoke by suitable means, such as the rivets F, and in providing flexibility in an intermediate section of the tube which will permit of a limited twisting of the same. This flexibility I preferably obtain by slitting the tube longitudinally, and preferably upon opposite sides thereof, as indicated at G. With the construction as described in operation, any torsional stresses in the tube B, due to an angular movement of the axle will result merely in the flexing of the portion containing the slits G, and the resiliency of the material is sufficient to permit of this flexing without permanent deformation of the tube. The construction has the advantage that it does away with the wear incident to any relative movement of the tube E and yoke F, and also with any noise or rattle.

What I claim as my invention is:

1. A torque rod, comprising a tube having members rigidly secured to opposite ends thereof, and a flexible intermediate section permitting of a limited twisting.

2. A torque rod, comprising a tube having the opposite ends thereof secured to relatively rotatable members, the intermediate portion of said tube being longitudinally slitted to provide flexibility.

3. A torque rod, comprising a tubing having one end thereof non-rotatively secured to the axle housing and the opposite end non-rotatively secured to a pivotal yoke, an intermediate portion of said tube being slitted to provide flexibility.

4. A torque rod, comprising a tube having one end thereof non-rotatively connected with the axle housing and the opposite end non-rotatively connected with a pivotal yoke, the intermediate portion of said tube being longitudinally slitted upon opposite sides thereof to provide flexibility.

In testimony whereof I affix my signature in presence of two witnesses.

GEORGE W. DUNHAM.

Witnesses:
     GLENN W. HUBBARD,
     CARL E. GREGORY.